United States Patent
Elmer et al.

(10) Patent No.: US 6,324,638 B1
(45) Date of Patent: Nov. 27, 2001

(54) PROCESSOR HAVING VECTOR PROCESSING CAPABILITY AND METHOD FOR EXECUTING A VECTOR INSTRUCTION IN A PROCESSOR

(75) Inventors: Thomas Elmer; Michael Putrino, both of Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/282,268

(22) Filed: Mar. 31, 1999

(51) Int. Cl.[7] .......................... G06F 15/17; G06F 13/40; G06F 9/302; G06F 9/305

(52) U.S. Cl. ................................ 712/17; 712/9; 712/5; 712/7; 712/11; 712/16

(58) Field of Search .................... 712/20, 7, 23, 712/229, 17, 5, 2, 4, 9, 8, 14, 10, 11, 16; 708/520; 714/784

(56) References Cited

U.S. PATENT DOCUMENTS

| | | | |
|---|---|---|---|
| 4,809,275 | * | 2/1989 | Inoue et al. .......................... 714/784 |
| 4,881,168 | * | 11/1989 | Inagami et al. .......................... 712/5 |
| 5,778,241 | * | 7/1998 | Bindloss et al. ........................ 712/20 |

* cited by examiner

Primary Examiner—Daniel H. Pan
(74) Attorney, Agent, or Firm—Robert M. Carwell; Bracewell & Patterson, L.L.P.

(57) ABSTRACT

A processor capable of executing vector instructions includes at least an instruction sequencing unit and a vector processing unit that receives vector instructions to be executed from the instruction sequencing unit. The vector processing unit includes a plurality of multiply structures, each containing only a single multiply array, that each correspond to at least one element of a vector input operand. Utilizing the single multiply array, each of the plurality of multiply structures is capable of performing a multiplication operation on one element of a vector input operand and is also capable of performing a multiplication operation on multiple elements of a vector input operand concurrently. In an embodiment in which the maximum length of an element of a vector input operand is N bits, each of the plurality of multiply arrays can handle both N by N bit integer multiplication and M by M bit integer multiplication, where N is a non-unitary integer multiple of M. At least one of the multiply structures also preferably includes an accumulating adder that receives as a first input a result produced by that multiply structure and receives as a second input a result produced by another multiply structure. From these inputs, the accumulating adder produces as an output an accumulated sum of the results in response to execution of the same instruction that caused the multiply structures to produce the intermediate results.

22 Claims, 11 Drawing Sheets

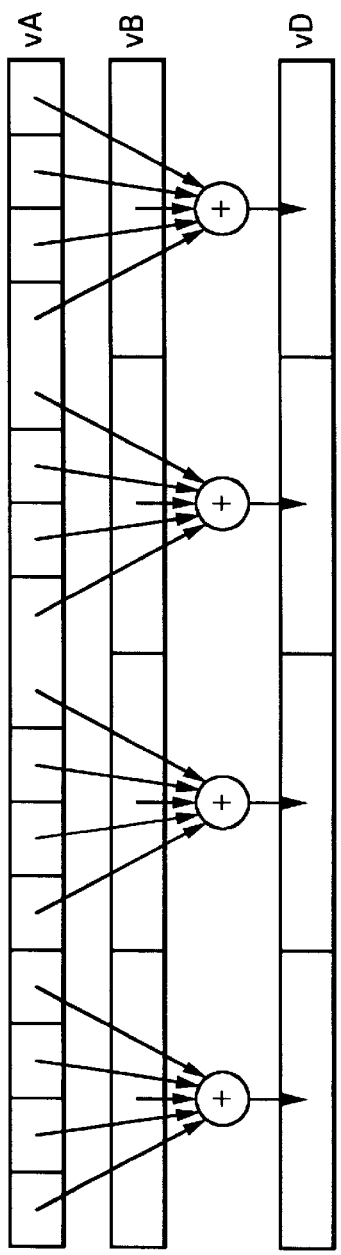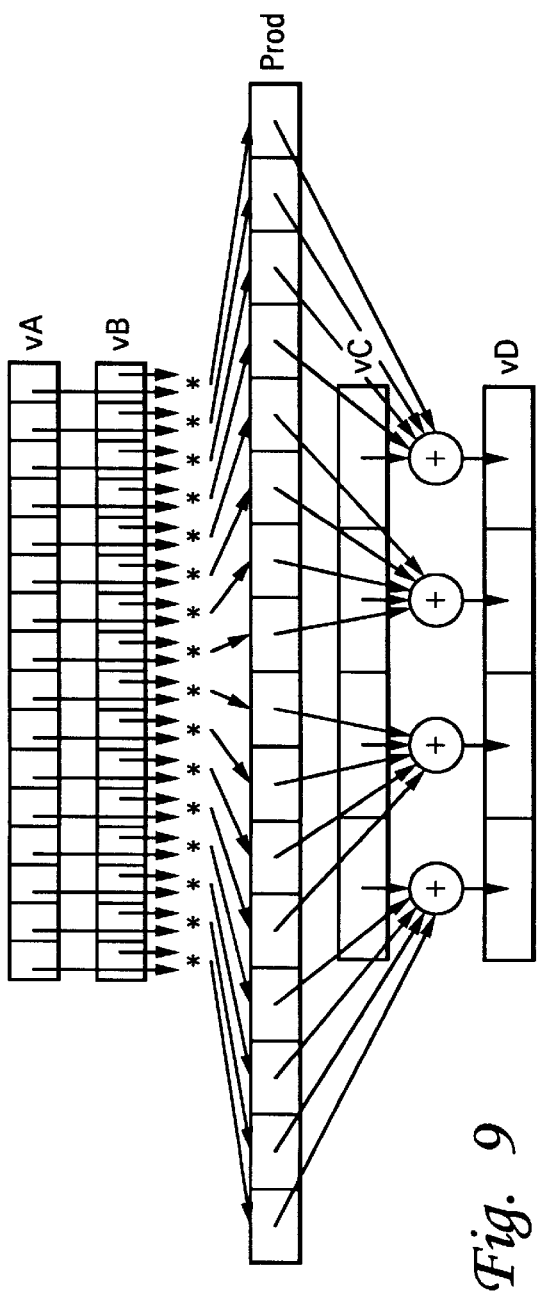

PROCESSOR HAVING VECTOR PROCESSING CAPABILITY AND METHOD FOR EXECUTING A VECTOR INSTRUCTION IN A PROCESSOR

BACKGROUND OF THE INVENTION

1. Technical Field

The present invention relates in general to data processing and, in particular, to a processor and method for processing vector instructions. Still more particularly, the present invention relates to a processor and data processing method in which vector instructions operating on vector elements of differing lengths are executed with significant hardware reuse.

2. Description of the Related Art

Traditionally, many computer systems capable of performing numerically-intensive applications followed one of two architectures. According to a first architecture, a computer system includes a central processing unit (CPU) for performing system-control functions and one or more numerical processing circuits, for example, Digital Signal Processor (DSPs), math co-processors, Application Specific Integrated Circuits (ASICs) or the like, for performing specialized computations. Because of the use of both a general-purpose CPU and specialized numerical processing circuitry, this architecture can be useful in a broad range of applications in addition to just numerically-intensive applications. However, the inclusion of both specialized computational circuitry and a general-purpose CPU within a computer system introduces significant complexity in that multiple diverse instruction and data streams must be concurrently supported, as well as significant communication between the specialized computational circuitry and the general-purpose CPU.

According to a second architecture, a computer system is implemented as a vector processor having tens or hundreds of identical Arithmetic Logic Units (ALUs) for processing multiple variable-length vectors in parallel. That is, each ALU processes a different one-dimensional vector in a pipelined fashion, and all ALUs operate concurrently. This second architecture, while specifically tailored to scientific computing and thus avoiding some of the complexity of the first architecture, is not optimal for performing a broad range of non-numerically intensive applications.

In addition to these architectures, a third architecture, exemplified by the PowerPC™ Reduced Instruction Set Computing (RISC) architecture, has emerged. According to the PowerPC™ RISC architecture, a single-chip general-purpose microprocessor is equipped with multiple execution units, including separate execution units for performing integer and floating point operations, that execute in parallel on a single instruction stream. This superscalar architecture has the advantage of being able to efficiently execute numerically-intensive applications, which typically contain a large percentage of floating point operations, as well as other types of applications, which tend to contain fewer floating-point operations than integer operations. The PowerPC™ RISC architecture is described in numerous publications, including *PowerPC Microprocessor Family: The Programming Environments,* Rev 1 (MPCFPE/AD) and *PowerPC 604™ RISC Microprocessor User's Manual* (MPC604UM/AD), which are incorporated herein by reference.

In accordance with the present invention, the computational capabilities of the PowerPC™ architecture have been expanded by the inclusion of an additional vector execution unit that operates concurrently with the other execution units on a single instruction stream. In contrast to the vector processing architecture described above, the vector execution unit within the PowerPC™ architecture can concurrently process all elements of one-dimensional fixed-length vector operands in parallel rather than one element at a time. The addition of vector processing capability to the general-purpose PowerPC™ architecture further accelerates its performance when executing numerically-intensive software applications.

SUMMARY OF THE INVENTION

In accordance with the present invention, a processor capable of executing vector instructions includes at least an instruction sequencing unit and a vector processing unit that receives vector instructions to be executed from the instruction sequencing unit. The vector processing unit includes a plurality of multiply structures, each containing only a single multiply array, that each correspond to at least one element of a vector input operand. Utilizing the single multiply array, each of the plurality of multiply structures is capable of performing a multiplication operation on one element of a vector input operand and is also capable of performing a multiplication operation on multiple elements of a vector input operand concurrently. In an embodiment in which the maximum length of an element of a vector input operand is N bits, each of the plurality of multiply arrays can handle both N by N bit integer multiplication and M by M bit integer multiplication, where N is a non-unitary integer multiple of M.

At least one of the multiply structures also preferably includes an accumulating adder that receives as a first input a result produced by that multiply structure and receives as a second input a result produced by another multiply structure. From these inputs, the accumulating adder produces as an output an accumulated sum of the results in response to execution of the same instruction that caused the multiply structures to produce the intermediate results. Thus, the processor supports vector multiplication and result accumulation in response to execution of a single vector instruction.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

FIG. 8 is a diagram of the Vector Sum Across Partial (1/4) Signed Byte Saturate (vsum4sbs) instruction;

FIG. 9 is a diagram of the Vector Multiply Sum Mixed-Sign Byte Modulo (vmsummbm) instruction;

DETAILED DESCRIPTION OF ILLUSTRATIVE EMBODIMENT

Figure 1:
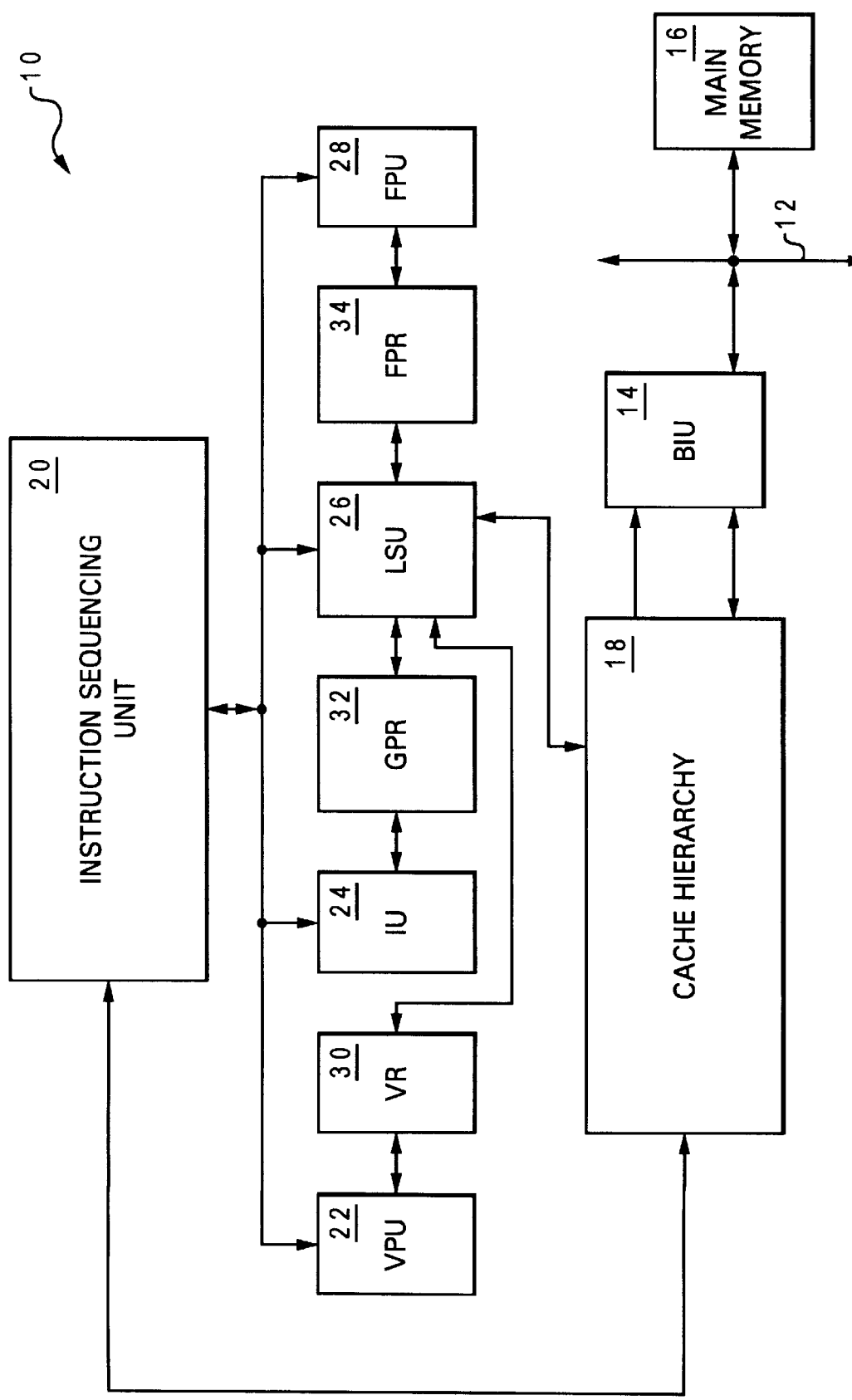
FIG. 1 depicts an illustrative embodiment of a processor including a vector processing unit (VPU) in accordance with the present invention.

With reference now to the figures and in particular with reference to FIG. 1, there is depicted a high level block diagram of an illustrative embodiment of a processor, indicated generally at 10, for processing instructions and data in accordance with the present invention. In the depicted illustrative embodiment, processor 10 comprises a single integrated circuit superscalar microprocessor. Accordingly, as discussed further below, processor 10 includes various execution units, registers, buffers, memories, and other functional units, which are all formed by integrated circuitry. Processor 10 preferably implements the PowerPC™ RISC architecture described in detail in AltiVec™ *Technology Programming Environments Manual:* Rev 0.1 (ALTIVECPEM/D), which is incorporated herein by reference; however, those skilled in the art will appreciate from the following description that the present invention can advantageously be implemented within other suitable processors to provide vector processing capability.

As illustrated in FIG. 1, processor 10 can be coupled to bus 12 via a bus interface unit (BIU) 14 within processor 10. BIU 14 controls the transfer of information between processor 10 and other devices coupled to bus 12, such as a main memory 16, which together with processor 10 and bus 12 form a fully functional data processing system. BIU 14 is also connected to cache hierarchy 18, which provides low latency storage for a subset of data and instructions previously transferred from main memory 16. Cache hierarchy 18 is further connected to instruction sequencing unit 20, which fetches instructions from cache hierarchy 18 during each cycle.

Branch instructions fetched from cache hierarchy 18 are processed internally by instruction sequencing unit 20; sequential instructions, on the other hand, are executed by vector processing unit (VPU) 22, integer unit (IU) 24, load-store unit (LSU) 26, and floating-point unit (FPU) 28, which each execute one or more classes of instructions. Instructions can be executed concurrently and opportunistically by VPU 22, IU 24, LSU 26, and FPU 28 in any order as long as data dependencies and antidependencies are observed. As shown, VPU 22, IU 24 and FPU 28 each have a respective register file, namely, Vector Register (VR) file 30, General-Purpose Register (GPR) file 32, and Floating-Point Register (FPR) file 34, from which operands are obtained and into which result data are stored. After one of execution units 22, 24 and 28 has finished executing an instruction, the execution unit stores data results in a rename buffer associated with its respective register file and notifies a completion buffer within instruction sequencing unit 20. Thereafter, the data results of the instruction are transferred from the rename buffer into one or more architected registers within the appropriate one of register files 30, 32 and 34.

Figure 2:
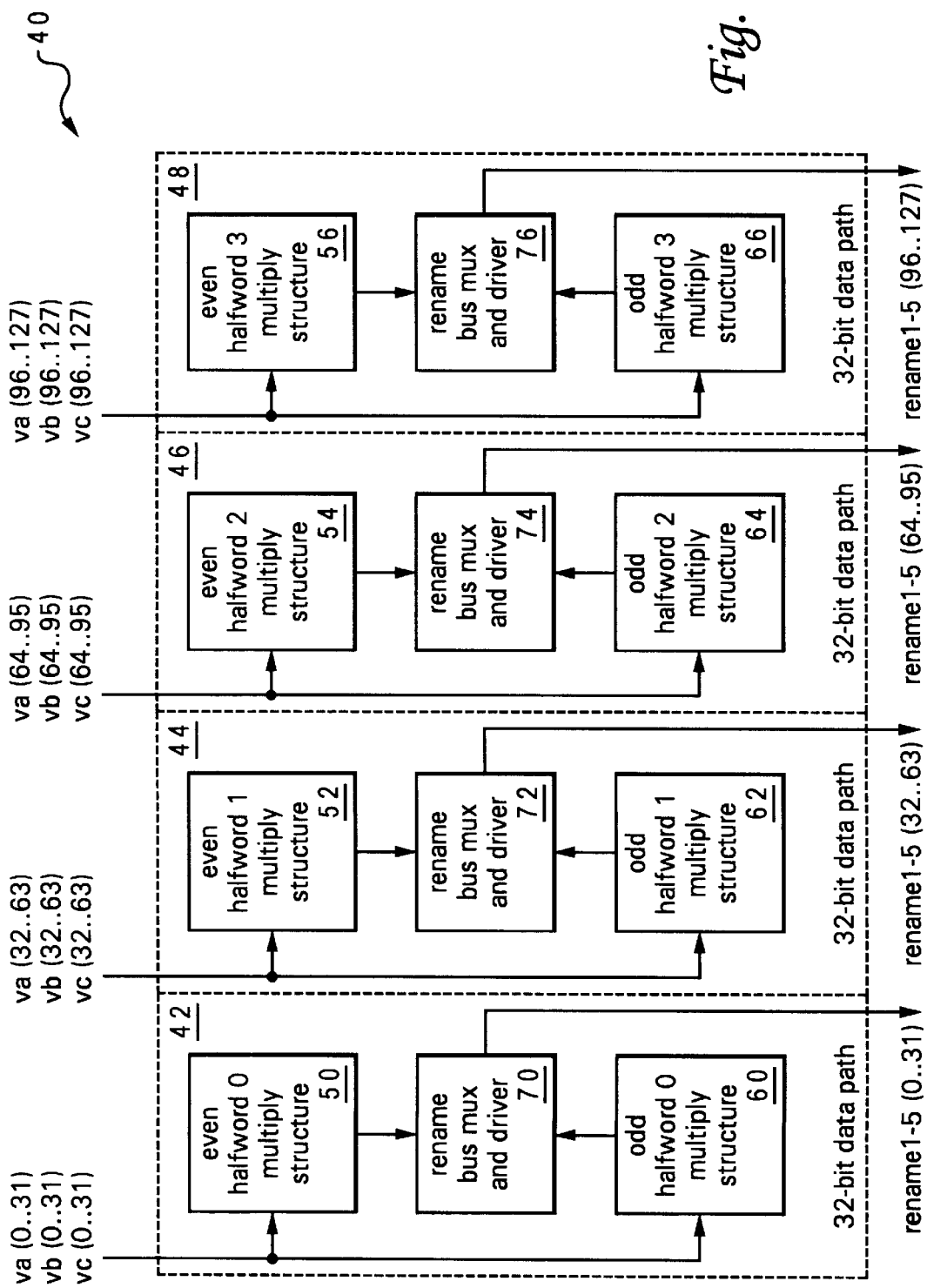
FIG. 2 is a block diagram of a complex fixed-point (CFX) unit within the vector processing unit (VPU) of FIG. 1.

Referring now to FIG. 2, there is depicted a high level block diagram of an illustrative embodiment of a complex fixed-point (CFX) unit 40 within VPU 22 of FIG. 1. In the illustrative embodiment, CFX unit 40 has four 32-bit data paths 42, 44, 46 and 48, which enable CFX unit 40 to perform complex arithmetic operations on up to three 128-bit vector operands (vA, vB, and vC) to produce a 128-bit result vD. Each of 32-bit data paths 42, 44, 46 and 48 includes a respective even halfword (i.e., left-most 16-bit) multiply structure 50–56 and a respective odd (i.e., right-most 16-bit) halfword multiply structure 60–66 that can each perform both byte and halfword arithmetic operations, as described in detail below. Data results of such arithmetic operations are supplied to an associated one of rename bus mux and drivers 70–76, which output the data results to an appropriate one of the five 128-bit rename buffers within VR file 30. As shown, it is preferred for each of rename bus mux and drivers 70–76 to be physically centrally located between the associated even and odd halfword multiply structures on the semiconducting substrate in order to balance output signal delay. This, however, is not a requirement.

The arithmetic operations that can be performed by CFX unit 40, which are each described in detail in AltiVec™ *Technology Programming Environments Manual:* Rev 0.1 (ALTIVECPEM/D), include the following (possible permutations of mnemonics are listed is parenthesis):

(1) vector multiply integer even/odd, unsigned/signed, byte/halfword (vmul(e/o)(u/s)(b/h)): multiplication of signed or unsigned bytes or halfwords of even or odd addresses;

(2) vector multiply-add integer (vm(h/l)add(s/u)h(s/m)): fused multiply-add of signed, high address halfwords in saturate form or fused multiply-add of unsigned, low address halfwords in modulo form;

(3) vector multiply-sum integer (vmsum(u/m)(b/h)(m/s)): fused multiply-sum of unsigned or mixed-sign bytes in modulo form or fused multiply-sum of unsigned or signed halfwords in modulo or saturate form;

(4) vector sum across signed integer saturate (vsumsws): direct summation of five 32-bit words in saturate form;

(5) vector sum across partial (1/2) signed integer saturate (vsum2sws): simultaneous direct summations of three 32-bit words in saturate form; and (6) vector sum across partial (1/4) integer saturate (vsum4 (u/s)(b/h)s): four simultaneous summations that each sum four signed or unsigned bytes with a 32-bit word or four simultaneous summations that each sum two signed halfwords with a 32-bit signed word.

Figure 3A:
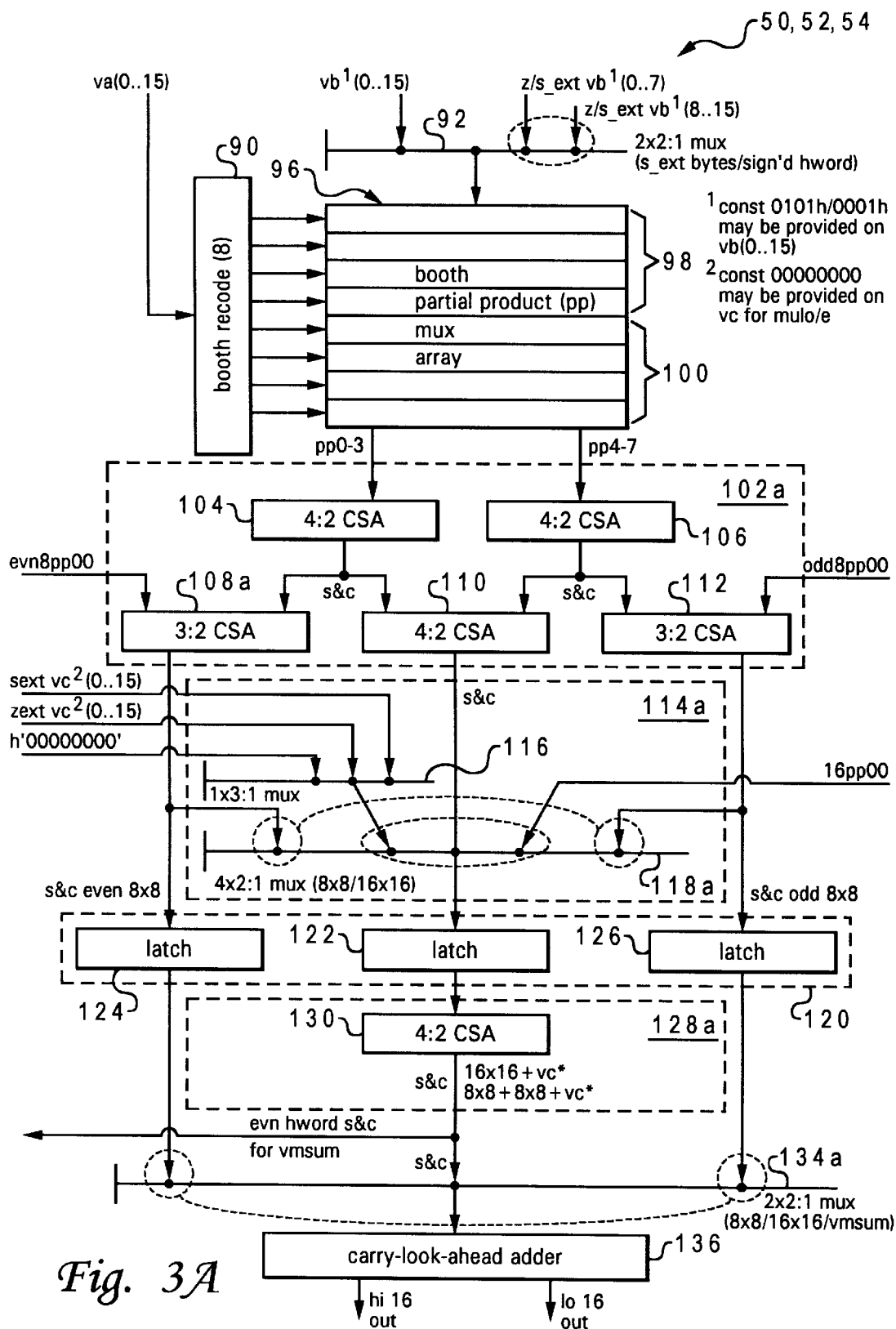
FIGS. 3A–3E are more detailed block diagrams of the halfword multiply structures within the CFX unit of FIG. 2, which all share a common architecture.
Figure 3B:
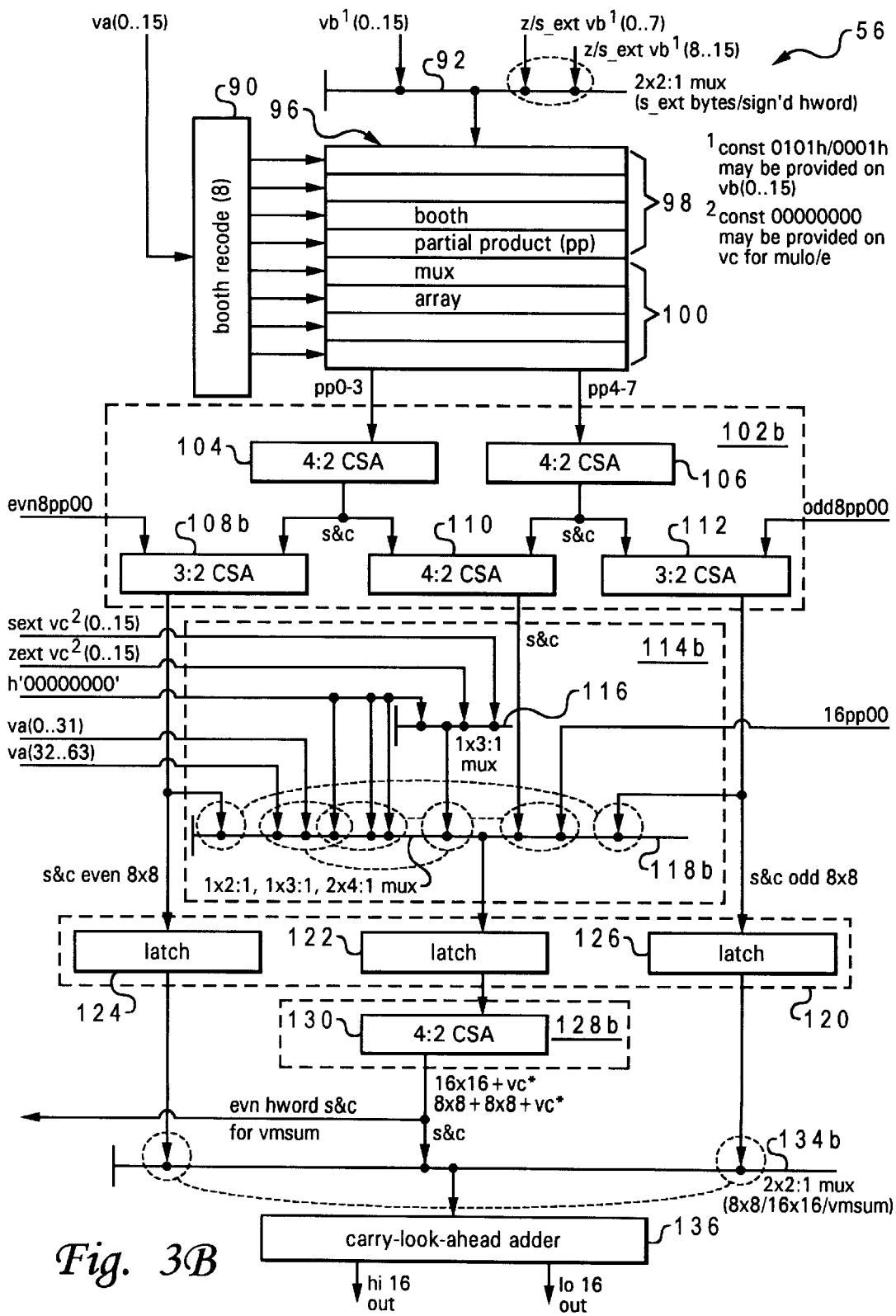
Figure 3C:
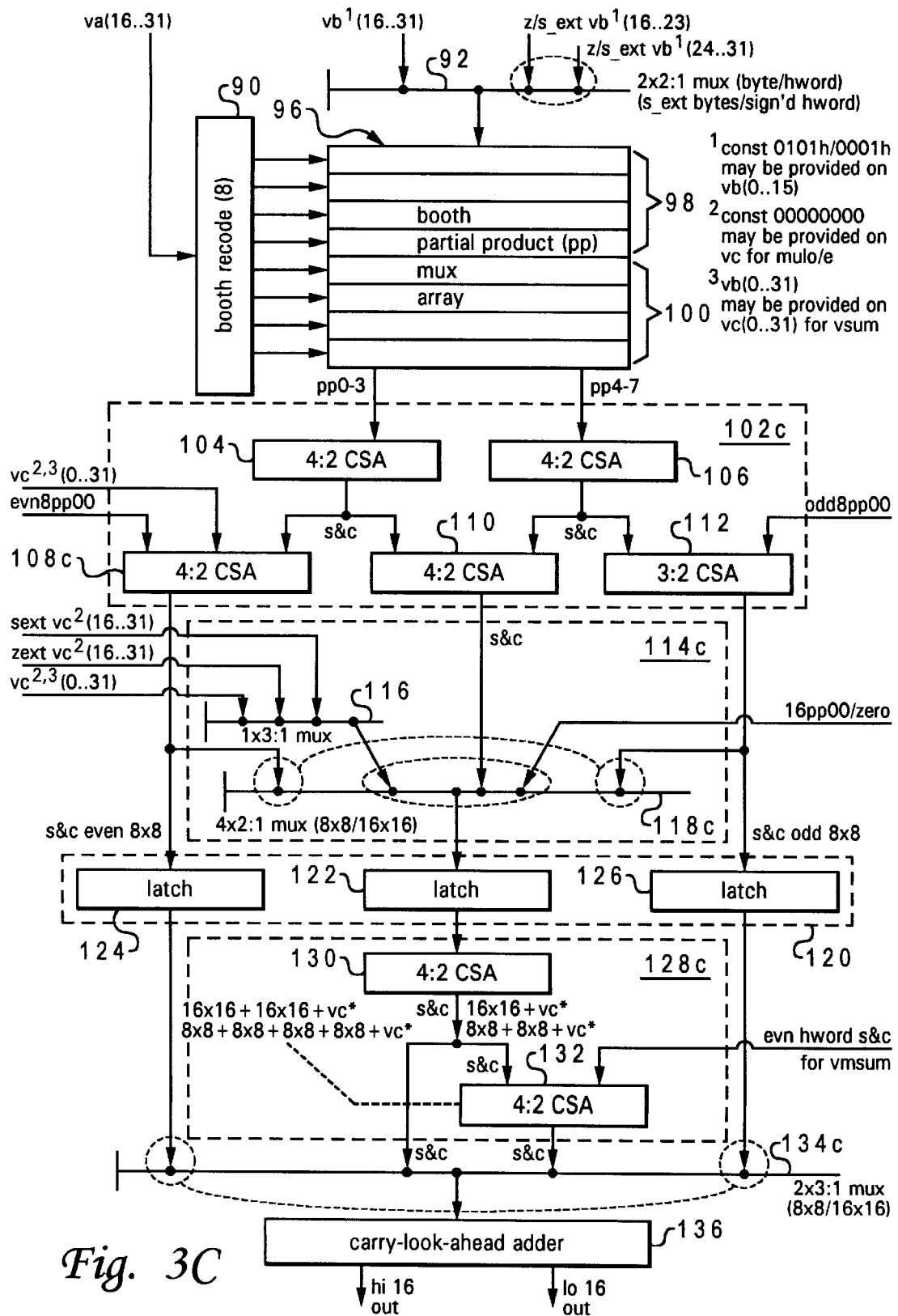
Figure 3D:
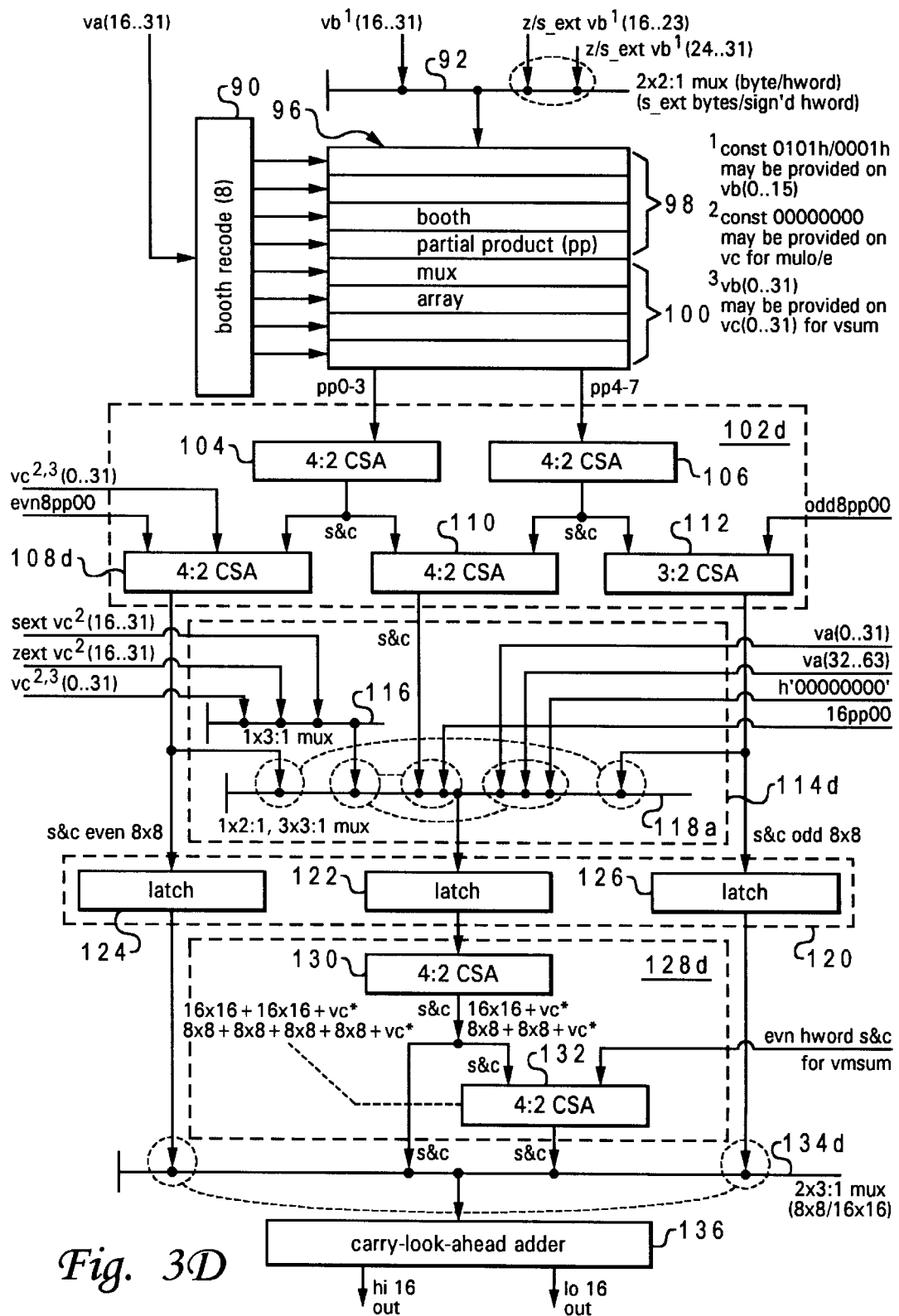
Figure 3E:
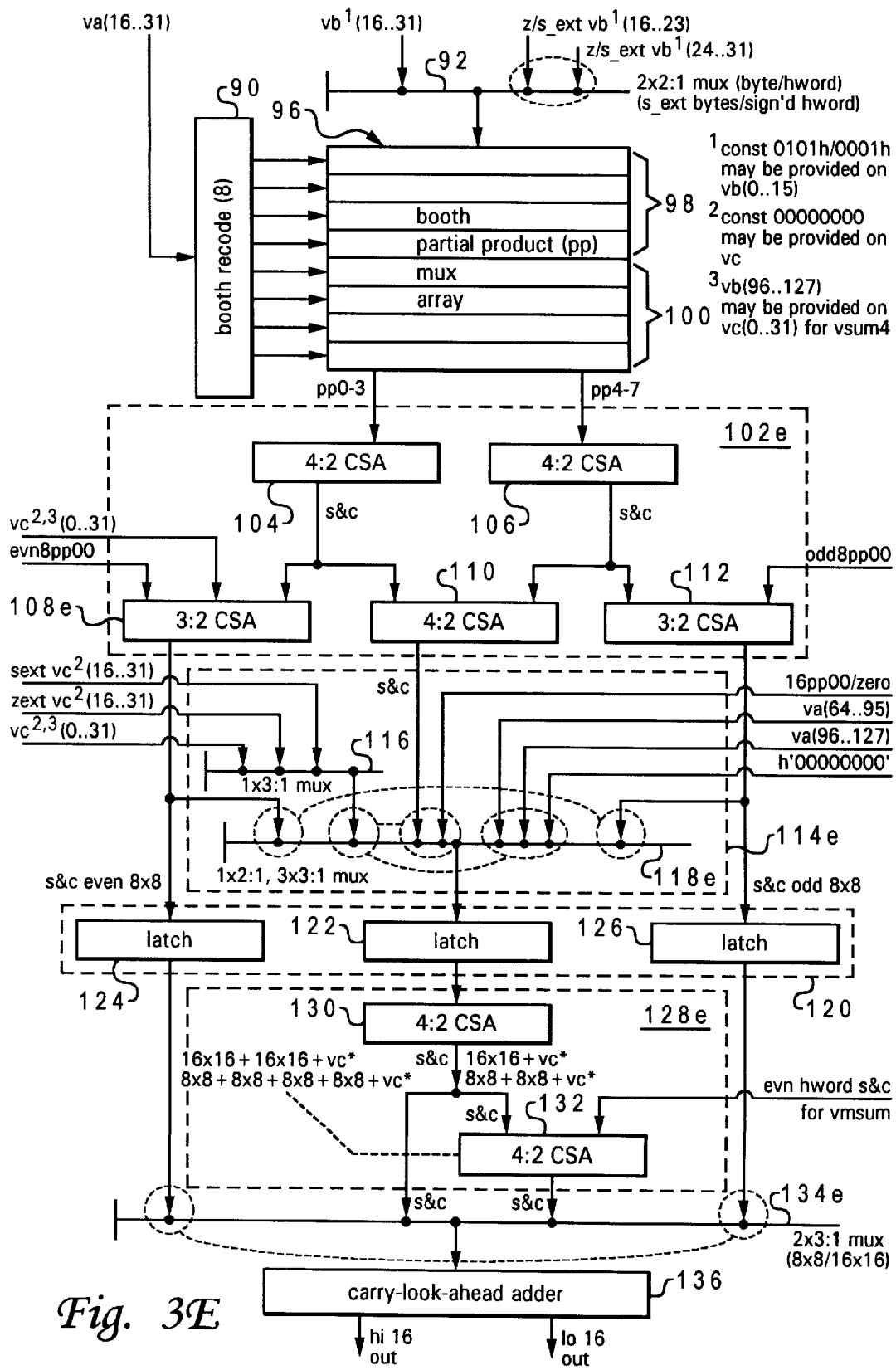

With reference now to FIGS. 3A–3E, there are illustrated block diagrams of five circuits that are each utilized to implement one or more of halfword multiply structures 50–56 and 60–66 of FIG. 2 according to a preferred embodiment in which bit 0 (the left-most bit) is the most significant bit. In particular, FIG. 3A illustrates an implementation of even halfword multiply structures 50, 52 and 54; FIG. 3B depicts an implementation of even halfword multiply structure 56; FIG. 3C illustrates an implementation of odd halfword multiply structures 60 and 64; FIG. 3D depicts an implementation of odd halfword multiply structure 62; and FIG. 3E depicts an implementation of odd halfword multiply structure 66. As indicated by corresponding reference numerals, all of multiply structures 50–56 and 60–66 share a common architecture and have only minor differences, which are indicated by reference numerals terminating with a letter (e.g., 102a). As will be appreciated, the significant duplication of hardware among halfword multiply structures 50–56 and 60–66 promotes efficient implementation and testing.

As shown in FIGS. 3A–3E, all of halfword multiply structures 50–56 and 60–66 include a booth recoder 90 and an input multiplexer 92 that provide inputs to a booth partial product mux array 96. Importantly, the contents of booth partial product mux array 96 can represent partial products for either two simultaneous 8-bit×8-bit multiply operations or a single 16-bit×16-bit multiply operation, depending upon the instruction type. Thus, if an instruction specifies that each 32-bit portion of operand vA contains four 8-bit values, the four high-order partial products 98 and the four low-order partial products 100 represent partial products for two simultaneous yet separate 8-bit multiply operations; conversely, if an instruction specifies that each 32-bit operand portion of vA contains two 16-bit values, all of partial products 98 and 100 together represent the partial products for a single 16-bit multiply operation.

In a preferred embodiment of the present invention, the partial products array within each halfword multiply structure is constructed as set forth in Vassiliadis et al., *Hard-Wired Multipliers with Encoded Partial Products*, IEEE Transactions on Computers, Vol. 40, No. 11, pp. 1181–1197, November 1991, which is incorporated herein by reference. In this preferred embodiment, the partial products (pp) array for 16 bits of vector operands vA and vB is formed as follows:

```
(evn8/16)pp00:  0XXXXXXXXXXXXXXXX0h
evn8pp0/16pp0:  1e2XXXXXXXXXXXXXXXX0h
evn8pp1/16pp1:  ..1e2XXXXXXXXXXXXXXXX0h
evn8pp2/16pp2:  ....1e2XXXXXXXXXXXXXXXX0h
evn8pp3/16pp3:  ......1e2XXXXXXXXXXXXXXXX0h
odd8pp0/16pp4:  ........1e2XXXXXXXXXXXXXXXX0h
odd8pp1/16pp5:  ..........1e2XXXXXXXXXXXXXXXX0h
odd8pp2/16pp6:  ............1e2XXXXXXXXXXXXXXXX0h
odd8pp3/16pp7:  ..............eee2XXXXXXXXXXXXXXXX
``` where x respresents a bit position, e represents a sign encode, h represents a "hot 1" (a one required for two-complement multiplication), 2 represents two times the value of the corresponding multiplicand bit position, and evn (odd) 8ppK/16ppL signifies the Kth byte partial product or the Lth halfword partial product. In addition, the term (evn8/16)pp00 represents a corrective multiple (i.e., 0 or +1) of the multiplicand that is used for unsigned even byte or halfword multiplication. Not shown in the partial products array is a similar corrective term odd8pp00, which is used for unsigned odd byte multiplications.

The 8 partial products pp0–3 and pp4–7 generated within booth partial product mux array 96 are then output to a first adder array 102, which in the illustrative embodiment contains a plurality of rows of Carry-Save Adders (CSAs). The first row of adders contains CSAs 104 and 106, which permit a reduction of the partial product terms to two sum and carry pairs. The second row of adders containing CSAs 108–112 can further reduce the number of partial product terms from 4 to 2 (i.e., a sum and carry pair) and provides an opportunity to sum the cumulative partial products terms with the partial product corrective terms (if required) for byte operations.

The intermediate sum(s) produced by first adder array 102 are fed to a first intermediate multiplexer circuit 114, which may receive the intermediate sums, partial product corrective terms (if required) for halfword operations, and a halfword of vector operand vc as inputs. In response to the instruction type, select signals for multiplexers 116 and 118 within first intermediate multiplexer circuit 114 are generated, and the outputs of intermediate multiplexer circuit 114 are latched by latching circuit 120. In the illustrative embodiment, each of halfword multiply structures 50–56 and 60–66 includes a latch 122 for latching the output of first intermediate multiplexing circuit 114 and two latches 124 and 126 for latching even and odd 8×8 intermediate values, respectively, produced by first adder circuit 102.

The output of latch 122 forms an input of second adder circuit 128. For even halfword multiply structures 50–56, second adder circuit 128 contains a single carry-save adder, such as 4:2 CSA 130. Odd halfword multiply structures 60–66, on the other hand, include both CSA 130 as well as an additional CSA 132 that permits the accumulation of even halfword values for sum across instructions (e.g., vmsum), as discussed further below. The outputs of latches 124 and 126 and the output of second adder circuit 128 form the inputs of a second intermediate multiplexer 134, which again chooses from among its inputs in response to the instruction type to select an input of third adder circuit 136. As depicted, in the illustrative embodiment, third adder circuit 136 is implemented as a single Carry Lookahead Adder (CLA) in all of halfword multiply structures 50–56 and 60–66. The 32-bit sum produced by each third adder circuit 136 can provide one of the two 32-bit inputs of an associated one of rename bus mux and drivers 70–76, which selects either 0, 16, or 32 bits from each such input as a portion of the data results (vD) of the instruction.

In order to facilitate a better understanding of the operation of halfword multiply structure architecture of the present invention, the architecture will now be described with reference to the execution of a number of different vector instructions.

Figure 4:
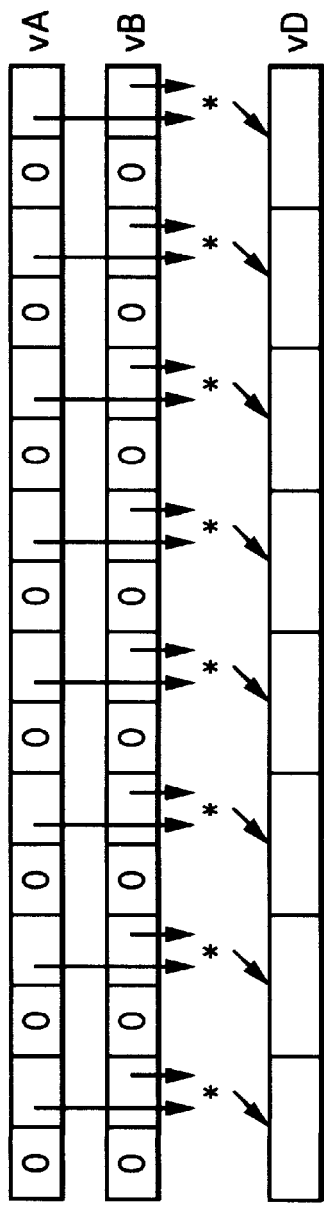
FIG. 4 is a diagram of the Vector Multiply Odd Unsigned Byte (vmuloub) instruction.

Referring now to FIG. 4, a diagram of the Vector Multiply Odd Unsigned Byte (vmuloub) instruction is depicted. As shown, the vmuloub instruction causes the odd-numbered unsigned-integer byte elements in operand vA to each be multiplied by the corresponding byte element in operand vB, with the eight resulting 16-bit unsigned-integer products being placed into the eight halfwords of vD. Each of halfword multiply structures 50–56 and 60–66 is utilized to produce a halfword of vD, that is, even halfword multiply structure 50 generates the first halfword, odd halfword multiply structure 60 generates the second halfword, etc.

For the vmuloub instruction, input multiplexer 92 selects zero-extended odd bytes of operand vB, and booth recoder 90 generates partial products utilizing the associated halfword of operand vA. Of the partial products within booth partial product mux array 96, only partial products 4–7 (those generated from the odd bytes of operand vA) are utilized in computing the final result. These 4 partial products are reduced to a sum and carry pair by CSA 106. This sum and carry pair is then summed within CSA 112 with the corrective partial product term odd8pp00, and the resulting sum and carry pair is latched by latch 126. During the second cycle of execution, second intermediate multiplexer 134 selects the output of latch 126 as the input of third adder circuit 136, which propagates the carry to obtain a 32-bit sum. The output multiplexer (i.e., the rename bus mux) then selects the low-order 16 bits output by each third adder circuit 136 as the respective halfword of the 128-bit result vD.

Figure 5:
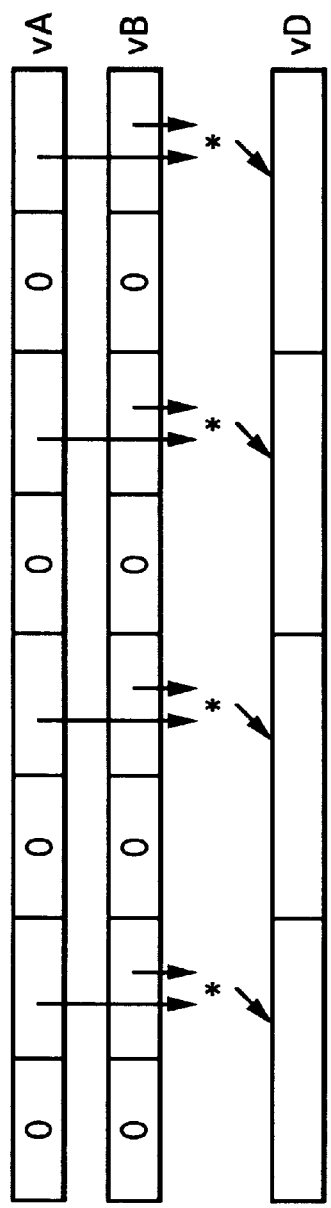
FIG. 5 is a diagram of the Vector Multiply Odd Unsigned Halfword (vmulouh) instruction.

With reference now to FIG. 5, a diagram of the Vector Multiply Odd Unsigned Halfword (vmulouh) instruction is illustrated. As shown, execution of the vmulouh instruction entails multiplying the odd-numbered unsigned-integer halfword elements in operand vA by corresponding unsigned-integer halfword element in operand vB, with the four resulting 32-bit unsigned-integer products being placed into the four words of vD. Each of odd halfword multiply structures 60–66 is utilized to produce a word of vD; even halfword multiply structures 50–56 are idle.

For the vmulouh instruction, input multiplexer 92 of each of odd halfword multiply structures 60–66 selects the corresponding halfword of operand vB, and booth recoder 90 generates partial products from the corresponding halfword of operand vA. The 8 partial products generated within booth partial product mux array 96 are reduced to two sum and carry pairs by CSAs 104 and 106. These two sum and carry pairs are then summed within CSA 110 to obtain a single 16×16 sum and carry pair, which together with the corrective partial product term 16pp00 and a 32-bit zero term are latched by latch 122. During the second cycle of execution, these four terms are summed by CSA 130 to a single 16×16 sum and carry pair, which is fed through second intermediate multiplexer 134 to third adder circuit 136. Third adder circuit 136 propagates the carry to form a 32-bit result, which is selected by the output multiplexer (i.e., the rename bus mux) as one of the four words of the 128-bit result vD.

Figure 6:
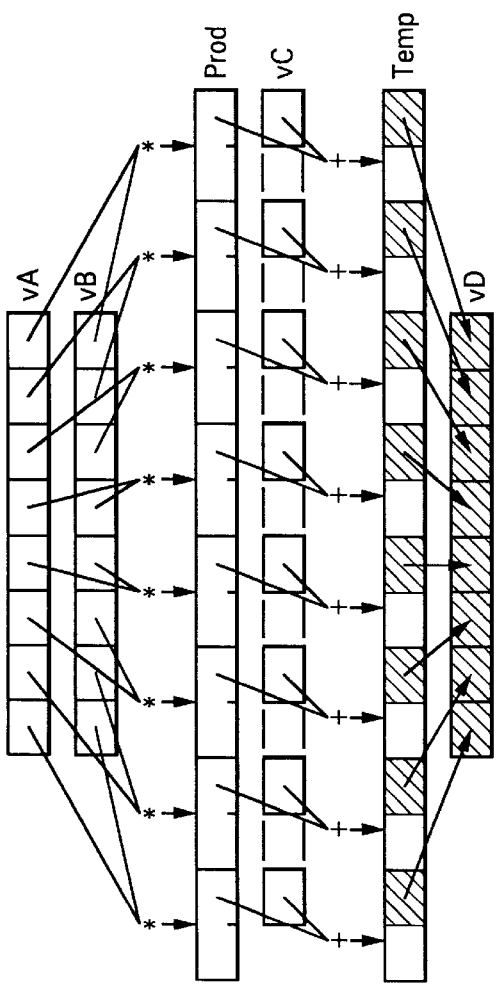
FIG. 6 is a diagram of the Vector Multiply Low and Add Unsigned Halfword Modulo (vmladduhm) instruction.

Referring now to FIG. 6, a diagram of the Vector Multiply Low and Add Unsigned Halfword Modulo (vmladduhm) instruction is depicted. As shown, the vmladduhm instruction causes each integer halfword element in vA to be multiplied by the corresponding integer halfword element in vB, producing 8 32-bit integer products. Each 32-bit product is added to the corresponding integer halfword element in vC, and each even halfword of the sum forms one of the eight halfwords of vD. In executing this instruction, each of halfword multiply structures 50–56 and 60–66 is utilized to produce a halfword of vD, that is, even halfword multiply structure 50 generates the first halfword, odd halfword multiply structure 60 generates the second halfword, etc.

For the vmladduhm instruction, input multiplexer 92 of each of halfword multiply structures 50–56 and 60–66 selects the corresponding halfword of operand vB, and booth recoder 90 generates partial products from the corresponding halfword of operand vA.

The 8 partial products generated within booth partial product mux array 96 are reduced to two 16×16 sum and carry pairs by CSAs 104 and 106. These two sum and carry pairs are then summed within CSA 110 to obtain a 16×16 sum and carry pair, which together with a zero-extended halfword of vC and the corrective partial product term 16pp00 are latched by latch 122. During the second cycle of execution, these four terms are summed by CSA 130 to obtain a single 16×16 sum and carry pair, which is fed through second intermediate multiplexer 134 to third adder circuit 136. Third adder circuit 136 propagates the carry through the sum to form a 32-bit result, of which the low-order 16 bits are selected by the output multiplexer (i.e., the rename bus mux) as one of the eight halfwords of the 128-bit result vD.

Figure 7:
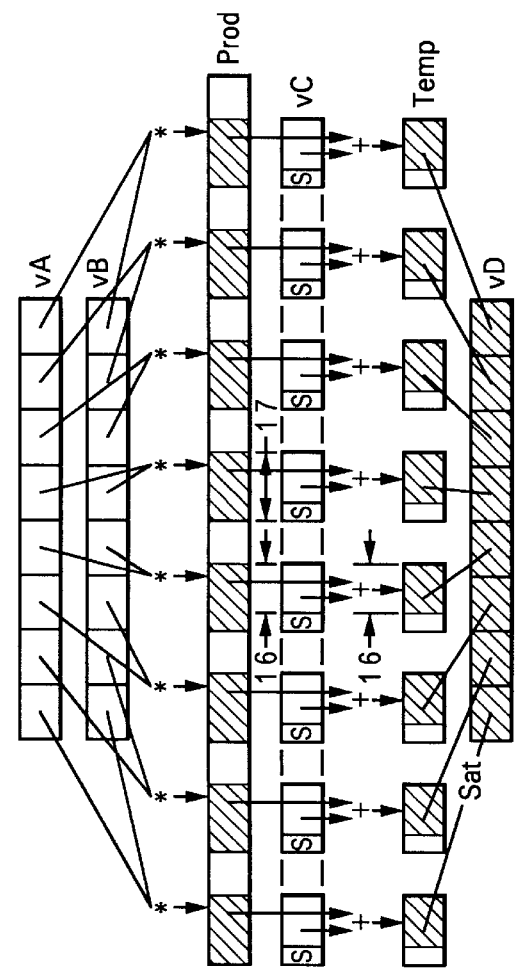
FIG. 7 is a diagram of the Vector Multiply High and Add Signed Halfword Saturate (vmhaddshs) instruction.

With reference now to FIG. 7, a diagram of the Vector Multiply High and Add Signed Halfword Saturate (vmhaddshs) instruction is illustrated. As shown, the vmhaddshs instruction multiplies each integer halfword element in vA by the corresponding signed-integer halfword element in vB, producing eight 32-bit signed-integer products. Bits 0–16 of the intermediate products are added to the corresponding signed-integer halfword element in vC (after sign-extension to 17 bits). The 16-bit (possibly saturated) result from each of the eight 17-bit sums is placed in vD. In execution, each of halfword multiply structures 50–56 and 60–66 is utilized to produce a halfword of vD.

For the vmhaddshs instruction, input multiplexer 92 of each of halfword multiply structures 50–56 and 60–66 selects the corresponding halfword of operand vB, and booth recoder 90 generates partial products from the corresponding halfword of operand vA. The 8 partial products generated within booth partial product mux array 96 are reduced to two 16×16 sum and carry pairs by CSAs 104 and 106. These two sum and carry pairs are then summed within CSA 110 to obtain a 16×16 sum and carry pair, which together with a sign-extended halfword of vC and the corrective partial product term 16pp00 are latched by latch 122. During the second cycle of execution, these four terms are summed by CSA 130 to obtain a single sum and carry pair, which is fed through second intermediate multiplexer 134 to third adder circuit 136. Third adder circuit 136 propagates the carry to form a 32-bit result, of which the high-order 16 bits are selected by the output multiplexer (i.e., the rename bus mux) as one of the eight halfwords of the 128-bit result vD.

Referring now to FIG. 8, a diagram of the Vector Sum Across Partial (1/4) Signed Byte Saturate (vsum4sbs) instruction is depicted. As shown, the vsum4sbs instruction adds the signed-integer sum of the four byte elements in each word of vA to the signed-integer in the corresponding word of vB. The four intermediate results, which are saturated if an underflow or overflow occurs, are then placed in the four words of vD. Although each of halfword multiply structures 50–56 and 60–66 is utilized in execution, the intermediate results generated by even halfword multiply structures are accumulated by odd halfword structures 60–66 so that the output of odd halfword multiply structures 60–66 supplies the four words of vD.

For the vsum4sbs instruction, input multiplexer 92 of each of halfword multiply structures 50–56 and 60–66 selects the halfword input '0x01010101', and booth recoder 90 generates partial products from the selected input and the corresponding halfword of operand vA. The use of the input constant '0x01010101' in the multiply operation is equivalent to performing the operation vA×1=vA. The 8 partial products generated within booth partial product mux array 96 are reduced to two sums and carry pairs by CSAs 104 and 106. The odd sum and carry pair is then summed with corrective partial product term odd8pp00 by CSA 112 to obtain a sum and carry pair, which is selected by first intermediate multiplexer circuit 114 and latched by latch 122. The even sum and carry pair is similarly summed with corrective partial product term evn8pp00 (and in odd halfword multiply structures 60–66 also with a corresponding word of vB) by CSA 108. The sum and carry pair output by CSA 108 is also selected by first intermediate multiplexer circuit 114 and latched by latch 122.

During the second cycle of execution, the two sum and carry pairs held by latch 122 are summed by CSA 130 to obtain a single sum and carry pair. The sum and carry pair produced by each of even halfword multiply structures 50–56 is then accumulated with the sum and carry produced by the associated odd halfword multiply structure by CSA 132 within the associated one of odd halfword multiply structures 60–66. The 32-bit sum produced by each CSA 132 is then fed through second intermediate multiplexer 134, third adder circuit 136, and the output multiplexer to form a word of the 128-bit result vD.

With reference now to FIG. 9, a diagram of the Vector Multiply Sum Mixed-Sign Byte Modulo (vmsummbm) instruction is depicted. As shown, the vmsummbm instruction multiplies each of the 16 signed-integer bytes of vA by the corresponding unsigned-integer byte of vB to produce an intermediate product. Each group of four of these intermediate products is summed together with a word of vC to form one of the four words of vD.

As above, each of halfword multiply structures 50–56 and 60–66 is utilized in execution, and the intermediate results generated by even halfword multiply structures 50–56 are accumulated by odd halfword structures 60–66 so that the output of odd halfword multiply structures 60–66 supplies the four words of vD.

For the vmsummbm instruction, input multiplexer 92 of each of halfword multiply structures 50–56 and 60–66 selects its portion of vB as two zero-extended bytes, and booth recoder 90 generates partial products from the appropriate halfword of operand vA. The 8 partial products generated within booth partial product mux array 96 to represent two separate 8×8 multiplications are reduced to two sums and carry pairs by CSAs 104 and 106. The odd sum and carry pairs are then summed with corrective partial product term odd8pp00 by CSA 112 to obtain an sum and carry pair, which is selected by first intermediate multiplexer circuit 114 and latched by latch 122. The even sum and carry pairs are similarly summed with corrective partial product term evn8pp00 (and in odd halfword multiply structures 60–66 also with a corresponding word of vC) by CSA 108. The sum and carry pair output by CSA 108 is also selected by first intermediate multiplexer circuit 114 and latched by latch 122.

During the second cycle of execution, the two sum and carry pairs held by latch 122 are summed by CSA 130 to obtain a single sum and carry pair. The sum and carry pair produced by each of even halfword multiply structures 50–56 is then accumulated with the sum and carry pair produced by the associated odd halfword multiply structure by CSA 132 within the associated one of odd halfword multiply structures 60–66. The 32-bit sum produced by each CSA 132 is then fed through second intermediate multiplexer 134, third adder circuit 136, and the output multiplexer to form a word of the 128-bit result vD.

Figure 10:
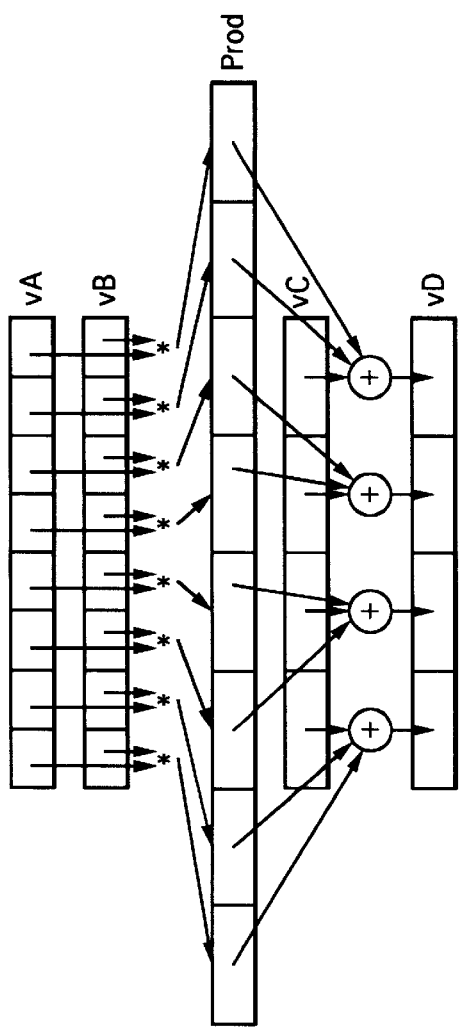
FIG. 10 is a diagram of the Vector Multiply Sum Signed Halfword Modulo (vmsumshm) instruction.

Referring now to FIG. 10, a diagram of the Vector Multiply Sum Signed Halfword Modulo (vmsumshm) instruction is depicted. As shown, the vmsumshm instruction performs the same operation as the vmsummbm operation described above, except that vA and vB are each treated as 8 signed-integer elements rather than 16 mixed-sign integer elements. As before, each of halfword multiply structures 50–56 and 60–66 is utilized in execution, and the intermediate results generated by even halfword multiply structures 50–56 are accumulated by odd halfword structures 60–66 so that the output of odd halfword multiply structures 60–66 supplies the four words of vD.

For the vmsumshm instruction, input multiplexer 92 of each of halfword multiply structures 50–56 and 60–66 selects its portion of vB as a halfword, and booth recoder 90 generates partial products from the appropriate halfword of operand vA. The 8 partial products generated within booth partial product mux array 96 to represent the halfword multiplication of vA and vB are reduced to two 16×16 sum and carry pairs by CSAs 104 and 106 and then further reduced to a single 16×16 sum and carry pair by CSA 110. For even halfword multiply structures 50–56, this sum and carry pair is selected by first intermediate multiplexer circuit 114 as an input of latch 122 together with the 32-bit zero term h'00000000' and the corrective partial product term 16pp00. In odd halfword multiply structures 60–66, a word of vC is input into latch 122 in lieu of the 32-bit zero term.

The terms held by each latch 122 are then summed by CSA 130 to obtain a single sum and carry pair. The sum and carry pair produced by each of even halfword multiply structures 50–56 is then accumulated with the sum and carry pair produced by the associated odd halfword multiply structure by CSA 132 within the associated one of odd halfword multiply structures 60–66. The 32-bit sum produced by each CSA 132 is then fed through second intermediate multiplexer 134, third adder circuit 136, and the output multiplexer to form a word of the 128-bit result vD.

Figure 11:
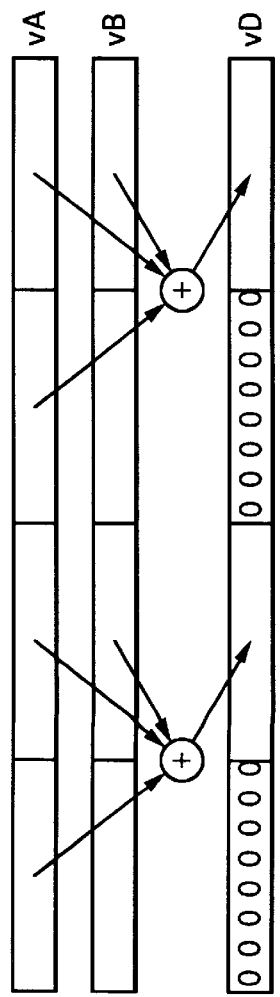
FIG. 11 is a diagram of the Vector Sum Across Partial (1/2) Signed Word Saturate (vsum2sws) instruction.

With reference now to FIG. 11, a diagram of the Vector Sum Across Partial (1/2) Signed Word Saturate (vsum2sws) instruction is depicted. As shown, the vsum2sws instruction sums the first and second words of vA with the second word of vB and places the result (which is saturated if needed) in the second word of vD, and similarly sums the third and fourth words of vA with the fourth word of vB and places the result (which is saturated if required) in the fourth word of vD. The first and third words of vD are filled with zeroes. Thus, only odd halfword multiply structures 62 and 66 are utilized to execute a vsum2sws instruction.

For the vsum2sws instruction, input multiplexer 92, booth recoder 90, and first adder array 102 of odd halfword multiply structures 62 and 66 are unused. In each of odd halfword multiply structures 62 and 66, a respective word of vB forms an input of multiplexer 116 and two words of vA and a 32-bit zero term form inputs of multiplexer 118. All 4 of these terms are output from first intermediate multiplexer circuit 114 and latched by latch 122. The four terms are then accumulated by CSA 130 to form a sum and carry, which are combined to form a 32-bit result by third adder circuit 136. The 32-bit result produced by odd halfword multiply structure 62 is selected by rename bus mux and driver 72 as the second word of vD, and the 32-bit result produced by odd halfword multiply structures 66 is selected by rename bus mux and driver 76 as the fourth word of vD.

Figure 12:
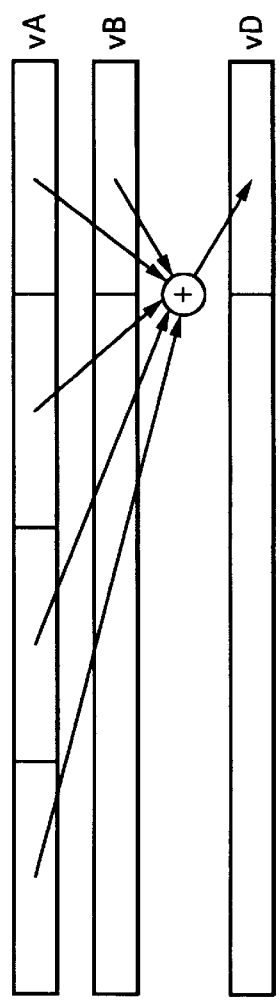
FIG. 12 is a diagram of the Vector Sum Across Signed Word Saturate (vsumsws) instruction.

Referring now to FIG. 12, a diagram of the Vector Sum Across Signed Word Saturate (vsumsws) instruction is illustrated. As shown, the vsumsws instruction sums all four words of vA with the last word of vB and places the result (which is saturated if needed) in the last word of vD. To execute this instruction, only halfword multiply structures 56 and 66 are utilized.

For the vsumsws instruction, input multiplexer 92, booth recoder 90, and first adder array 102 of halfword multiply structures 56 and 66 are unused. In even halfword multiply structure 56, bits 0 . . . 31 of vA, bits 32 . . . 63 of vA, and two 32-bit zero term each form an input of multiplexer 118. All 4 of these terms are output from first intermediate multiplexer circuit 102 and latched by latch 122. The four terms are then accumulated by CSA 130 to form a sum and carry, which are input into CSA 132 of odd halfword multiply structure 66.

Meanwhile, in odd halfword multiply structure 66, bits 64 . . . 95 of vA, bits 96 . . . 127 of vA, bits 96 . . . 127 of vB, and a 32-bit zero term each form an input of multiplexer 118. All four of these terms are output from first intermediate multiplexer circuit 114 and latched by latch 122. The four terms are then accumulated by CSA 130 to form a sum and carry, which are input into CSA 132. CSA 132 sums its two sum inputs and two carry inputs to produce a single sum and carry pair, which is fed through multiplexer 134 to third adder circuit 136. Third adder circuit 136 propagates the carry to produce a 32-bit (possibly saturated) sum, which is selected by rename bus mux and driver 76 as the fourth word of vD (bits 96 . . . 127).

As has been described, the present invention provides a processor having a vector processing unit capable of performing a number of complex fixed-point and integer operations on all or a subset of the elements of short fixed-length vector operands. The vector processing unit contains a plurality of multiply structures that each correspond to a portion of an input operand, where each of the multiply structures is capable of performing multiplication operations on vector elements of multiple widths utilizing a single set of multiplier hardware. The plurality of multiply structures are also interconnected such that the arithmetic combination of multiple intermediate results can be performed in a single instruction.

While the invention has been particularly shown and described with reference to a preferred embodiment, it will be understood by those skilled in the art that various changes in form and detail may be made therein without departing from the spirit and scope of the invention.

What is claimed is:

1. A processor, comprising:

an instruction sequencing unit; and a vector processing unit coupled to receive instructions to be executed from said instruction sequencing unit, said vector processing unit including a plurality of multiply structures that each correspond to at least one element of a vector input operand and each contain only a single multiply array, wherein, utilizing said single multiply array, each of said plurality of multiply structures is capable of performing a multiplication operation on one element of a vector input operand and is also capable of performing a multiplication operation on multiple elements of a vector input operand concurrently.

2. The processor of claim 1, wherein all of said plurality of multiply structures operate in parallel such that all elements of a vector input operand are processed in parallel.

3. The processor of claim 1, wherein a maximum length of an element of a vector input operand is N bits, and wherein each of said plurality of multiply arrays can handle both N by N bit integer multiplication and M by M bit integer multiplication, where N is a non-unitary integer multiple of M.

4. The processor of claim 1, wherein at least one of said plurality of multiply structures includes an accumulating adder that receives as a first input a result produced by that multiply structure and receives as a second input a result produced by another multiply structure and produces as an output an accumulated sum of said results in response to a same instruction that caused said multiply structures to produce said results.

5. The processor of claim 1, wherein each multiply array contains booth-encoded partial products of at least one vector input element.

6. The processor of claim 1, wherein each multiply structure further comprising an adder array coupled to said multiply array that sums selected partial products generated by said multiply array.

7. The processor of claim 6, wherein each adder array including a plurality of rows of adders connected to form at least a first set of data paths and a second set of data paths, wherein said first set of data paths is employed if one element of an vector input operand is processed by a multiply structure and said second set of data paths is employed if multiple elements of a vector input operand are processed by said multiply structure.

8. The processor of claim 6, wherein said adder array is a first adder circuit, each multiply structure further comprising a second adder circuit that adds one or more sums output by said first adder circuit with at least one corrective partial product term.

9. The processor of claim 1, wherein:

said multiply structures are grouped in pairs with each multiply structure within a pair of multiply structures processing up to a halfword of a vector input operand assigned to that pair; and said vector processing unit includes an output multiplexer for each respective pair of multiply structures, each output multiplexer receiving up to a word of data from each multiply structure within its pair and outputting up to a word of an instruction's data result.

10. The processor of claim 9, wherein said processor is formed of integrated circuitry on a semiconductor substrate, and wherein each output multiplexer is substantially centrally located on said semiconductor substrate between its associated pair of multiply structures.

11. The processor of claim 1, and further comprising at least a load-store unit and an integer unit coupled to said instruction sequencing unit in parallel with said vector processing unit.

12. A processor, comprising:

an instruction sequencing unit; and a vector processing unit coupled to receive instructions to be executed from said instruction sequencing unit, said vector processing unit including a plurality of multiply structures that each correspond to at least one element of a vector input operand and each contain only a single multiply array, wherein, utilizing said single multiply array, each of said plurality of multiply structures is capable of performing a M by M bit integer multiplication operation on a vector input operand and is also capable of performing a N by N bit integer multiplication operation on a vector input operand, where N is a non-unitary integer multiple of M.

13. The processor of claim 12, wherein all of said plurality of multiply structures operate in parallel such that all elements of a vector input operand are processed in parallel.

14. The processor of claim 12, wherein, utilizing said single multiply array, each of said plurality of multiply structures is capable of performing a multiplication operation on one element of a vector input operand and is also capable of performing a multiplication operation on multiple elements of a vector input operand concurrently.

15. The processor of claim 12, wherein at least one of said plurality of multiply structures includes an accumulating adder that receives as a first input a result produced by that multiply structure and receives as a second input a result produced by another multiply structure and produces as an output an accumulated sum of said results in response to a same instruction that caused said multiply structures to produce said results.

16. A processor, comprising:

an instruction sequencing unit; and a vector processing unit coupled to receive instructions to be executed from said instruction sequencing unit, said vector processing unit including a plurality of multiply structures that each correspond to at least one element of a vector input operand, wherein at least one of said plurality of multiply structures includes an accumulating adder that receives as a first input a result produced by that multiply structure and receives as a second input a result produced by another multiply structure and produces as an output an accumulated sum of said results in response to a same instruction that caused said multiply structures to produce said results.

17. The processor of claim 16, wherein all of said plurality of multiply structures operate in parallel such that all elements of a vector input operand are processed in parallel.

18. The processor of claim 16, wherein each of said multiply structures includes a single multiply array, and wherein, utilizing said single multiply array, each of said plurality of multiply structures is capable of performing a multiplication operation on one element of a vector input operand and is also capable of performing a multiplication operation on multiple elements of a vector input operand concurrently.

19. The processor of claim 16, wherein each of said multiply structures includes a single multiply array, and wherein a maximum length of an element of a vector input operand is N bits, and wherein each of said plurality of multiply arrays can handle both N by N bit integer multiplication and M by M bit integer multiplication, where N is a non-unitary integer multiple of M.

20. A method of executing a vector instruction in a processor having vector processing capability, said method comprising:

in response to receipt of a single vector instruction specifying at least one vector input operand, executing said single vector instruction, wherein executing said single vector instruction includes:

concurrently performing an arithmetic operation on each of a plurality of elements within said at least one vector input operand to obtain at least two intermediate results; and summing said at least two intermediate results to obtain an accumulated result that forms at least a portion of a data result of said single vector instruction.

21. The method of claim 20, wherein said arithmetic operation is integer multiplication.

22. The method of claim 21, said processor including a plurality of multiply structures that each receive and perform an arithmetic operation on a portion of said vector input operand, said method further comprising determining a number of elements within each portion of said vector input operand in response to said single vector instruction.

* * * * *

UNITED STATES PATENT AND TRADEMARK OFFICE
CERTIFICATE OF CORRECTION

PATENT NO.     : 6,324,638 B1
DATED          : November 27, 2001
INVENTOR(S)    : Elmer et al.

It is certified that error appears in the above-identified patent and that said Letters Patent is hereby corrected as shown below:

<u>Title page,</u>
Item [73], Assignee, add -- Motorola, Inc., Schaumberg, IL (US) --.

Signed and Sealed this

Thirteenth Day of August, 2002

Attest:

Attesting Officer

JAMES E. ROGAN
*Director of the United States Patent and Trademark Office*